Feb. 19, 1929.
P. BROSSE
1,703,026
FILM GOPHERING CYLINDER
Filed July 6, 1926
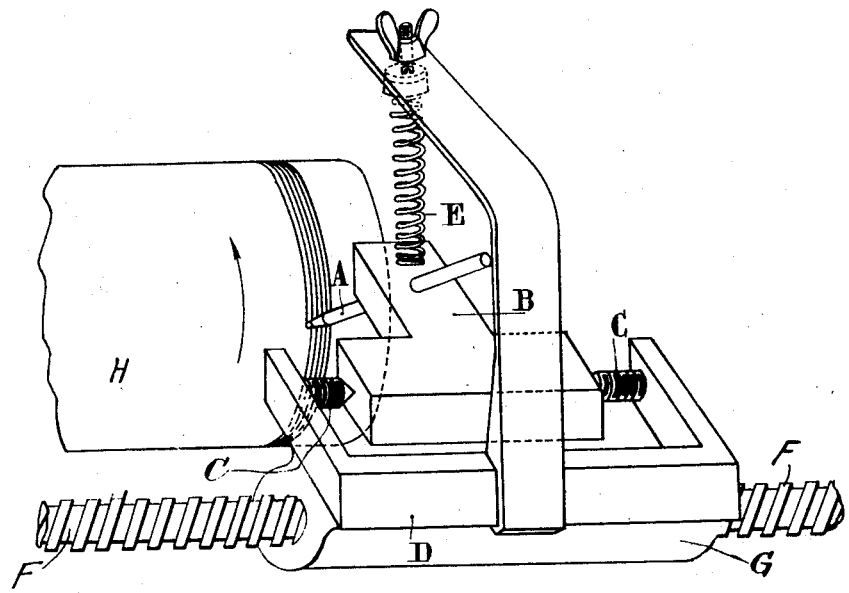
INVENTOR:
Paul Brosse
BY
ATTORNEY Patented Feb. 19, 1929.

1,703,026

UNITED STATES PATENT OFFICE.

PAUL BROSSE, OF NEUILLY SUR SEINE, FRANCE.

FILM-GOPHERING CYLINDER.

Application filed July 6, 1926, Serial No. 120,841, and in France February 9, 1926.

In my French Patent No. 399,762, dated May. 1, 1908, I defined the conditions required to effect colour photography and kinematography by using a "gophered" film. Such gophering is constituted by microscopic refracting elements and is obtained by hot rolling the film under pressure on a suitably engraved die.

The above mentioned patent indicated that the said refracting elements may be in the form of symmetrically arranged "picots" or specks, or, on the contrary, may offer the shape of semi-cylindrical flutings forming lines which may be parallel to the axis of the film or at any angle therewith.

Experience has shown that the refracting microscopic elements moulded on the surface of the film must offer certain invariable characteristics which are indispensable in order that the film may lend itself to all the uses for which it is intended, and especially, to reprinting.

Said characteristics are:

1. A given and invariable curvature for one and the same thickness of film, i. e., substantially .04 mm. for film from .12 to .13 mm. thick.

2. Perfect polish extending to the junction of consecutive elements so as to avoid any diffusion of light.

3. Joining of the consecutive elements in the shape of a sharp edge so as to eliminate any surface that does not act as a convergent element.

4. Absolute symmetry of the elements over the whole surface of the film.

The above characteristics can only be obtained on the film if they have previously been obtained on the cylinder used to gopher the film.

Therefore, it is essential that there be formed on the surface of the cylinder, elements having a strictly accurate geometrical and optical curvature, perfectly polished and joined, and, moreover, distributed in an absolutely symmetrical manner over the whole surface.

The engraved dies in use for gophering specked or fluted film do not permit all attainable efficiency to be obtained. The punches or milling wheels that serve for making the die itself, undergo, on tempering, an alteration of their working surface which then presents a more or less deadened aspect. If milling wheels are used or if the dies are cut directly by a combined tool holder and cutter, the profile of such tool rapidly becomes modified and, above all—due to variable homogeneousness of the metal used—there occur small tearings which impair the smoothness and polish of the cut surface.

Any film gophered by means of such dies will show, on inspection through a microscope, an aspect more or less deadened. This deadening of the refracting elements will produce diffusion and this diffusion, detrimental to the sharpness of projection, may absolutely prevent printing from the original film, and, therefore, preclude production of copies.

Of all imaginable refracting elements, the easiest obtainable that will meet the above set forth requirements are unquestionably elements of linear form which, furthermore, ensure greater luminosity and readier reproduction, without any new parts having to be introduced into the optical system.

Consequently, the object of my invention is to provide perfectly gophered cylinders adapted to mould such linear refracting microscopic nets on the surface of trade cinematographic films; but for the reasons set forth above, I have been led to discard both the process of gophering the cylinder which involves engraving, and the one which involves use of a combined cutting tool and holder. The use of a milling wheel, although more advantageous, involves certain unavoidable drawbacks:

1. It is practically impossible to rectify all the points of its periphery to the necessary theoretical curvature.

2. It is quite as impossible to make it revolve with an accuracy of the order of a thousandth of a millimeter, which, however, is indispensable in order to avoid formation of "waterings."

According to my invention and in order to obtain the hereabove enumerated conditions, I work the surface of the cylinder by "burnishing" it with a tool and holder made in one, the tool itself being of some practically wearproof substance (diamond, for instance) and being rounded to the form and to the exact curvature of the fluting and perfectly polished. This tool, or special burnisher, forces back the metal of the cylinder by "rubbing" and traces on the cylinder a helix with joined spires giving the results sought for. This result is quite feasible, considering that the depth of the hollowed-out elements does not exceed .006 mm. On the other hand, I thus obtain a strictly constant curvature of the refracting elements since it is always the same zone of the tool that is working on the whole surface of the cylinder.

Furthermore it is evident that a polish as perfect as the polish of the burnisher itself will be obtained, and that absolute symmetry of the elements will be ensured with as great an accuracy as desired, since it depends solely on the accuracy of the dividing mechanism by which the tool is operated.

The surface of the cylinder, previously rectified with the utmost care, will itself be perfectly polished before being submitted to the operation of the burnisher. There will even be an advantage in depositing upon the surface of the cylinder a covering sheet made of a metal calculated to give a perfect polish such as silver, gold, etc.

The single figure of the drawing appended hereto represents, merely as an example, a fragmental perspective view of one form of mechanism or apparatus for carrying out the invention.

The mounting of the burnisher on the dividing machine employed merely requires care in order to ensure its being kept in an invariable plane and to ensure constancy of pressure on the surface of the cylinder worked upon.

In the case illustrated, this two-fold result is obtained by attaching the tool A, (which has its point made of, for instance, diamond) to the stem member of a T shaped carrier B which is mounted to rock on lateral pivots C set into the arms of a yoke D; said tool being pressed against the surface of the cylinder H by the action of an adjustable spring E or the like that bears upon the stem of carrier B. The yoke D is itself mounted on the threaded feed-screw or shaft F of the machine so as to have imparted to it a slow and gradual lateral or sidewise movement relative to the cylinder H; said yoke being provided for that purpose with an internally-threaded sleeve G through which screw F passes.

It goes without saying that when I gopher film by means of a cylinder with polished flutings obtained through the process which is the object of my invention, the flutings are driven "home" in the film; that is to say, the network of refracting elements produced on the surface of the film necessarily follows absolutely the outline of the fluting throughout the entire extent of such surface, and said elements have the same exact curvature and the same polish as the flutings themselves in accordance with the previously established conditions.

I claim as my invention:

1. A process of treating metal-surfaced cylinders for gophering motion picture film for photography in colors, comprising the step of forcing back the metal of the cylinder surface in a manner to trace therein a continuous helical pressure-indentation which is composed of an infinite number of extremely fine, parallel linear spires of strictly-constant cross-sectional shape and curvature throughout, and polishing such spires from end to end of the helix incidental to and concurrently with their formation.

2. A process of treating metal-surfaced cylinders for gophering motion picture film for photography in colors, comprising the steps of rotating the cylinder while forcing back the metal of its surface to form therein a linear pressure-indentation of strictly-constant cross-sectional curvature throughout and the entire wall of which is polished incidental to and concurrently with its formation; and simultaneously effecting a slow and gradual relative feed movement between the cylinder and its indenting means to continue the indentation from end to end of the cylinder in the form of a helix embodying an infinite number of extremely fine, parallel linear spires.

3. A metal-surfaced cylinder for gophering motion picture film, having the metal of its surface compressed to form therein a continuous helical pressure-indentation embodying an infinite number of extremely fine, parallel linear spires of strictly-constant shape and curvature throughout and polished from end to end of the helix.

4. A cylinder for gophering motion picture film, having a surface layer of a metal which will take a high polish, the metal of said layer being compressed to form therein a continuous helical pressure-indentation embodying an infinite number of extremely-fine, parallel linear spires of strictly-constant shape and curvature throughout and polished from end to end of the helix.

In testimony whereof I affix my signature.

PAUL BROSSE.